United States Patent
Atif et al.

(10) Patent No.: US 10,306,158 B2
(45) Date of Patent: May 28, 2019

(54) INFRARED IMAGING SYSTEM AND METHOD OF OPERATING

(71) Applicant: SONY CORPORATION, Tokyo (JP)

(72) Inventors: Muhammad Atif, Stuttgart (DE);
Muhammad Siddiqui, Esslingen (DE);
Christian Unruh, Stuttgart (DE);
Markus Kamm, Karlsruhe (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/714,527

(22) Filed: Sep. 25, 2017

(65) Prior Publication Data

US 2018/0013965 A1 Jan. 11, 2018

Related U.S. Application Data

(60) Division of application No. 14/701,092, filed on Apr. 30, 2015, now Pat. No. 9,800,804, which is a
(Continued)

(30) Foreign Application Priority Data

May 2, 2011 (EP) .................................... 11003573

(51) Int. Cl.
*H04N 5/33* (2006.01)
*G02B 27/00* (2006.01)
(Continued)

(52) U.S. Cl.
CPC .............. *H04N 5/332* (2013.01); *G02B 13/14* (2013.01); *G02B 27/005* (2013.01);
(Continued)

(58) Field of Classification Search
CPC .......... H04N 5/332; H04N 9/083; H04N 9/07; H04N 9/045; H04N 5/3572;
(Continued)

(56) References Cited

U.S. PATENT DOCUMENTS 5,748,371 A 5/1998 Cathey, Jr. et al.
6,166,300 A 12/2000 Silverstein et al.
(Continued)

OTHER PUBLICATIONS

J. Garcia et al., "Chromatic Aberration and Depth Extraction", 15th International Conference on Pattern Recognition, 2000, vol. 1, pp. 762-765, 1 Page (Abstract Only).
(Continued)

*Primary Examiner* — Jared Walker
(74) *Attorney, Agent, or Firm* — Xsensus LLP

(57) ABSTRACT

A lens unit (120) shows longitudinal chromatic aberration and focuses an imaged scene into a first image for the infrared range in a first focal plane and into a second image for the visible range in a second focal plane. An optical element (150) manipulates the modulation transfer function assigned to the first and second images to extend the depth of field. An image processing unit (200) may amplify a modulation transfer function contrast in the first and second images. A focal shift between the focal planes may be compensated for. While in conventional approaches for RGBIR sensors contemporaneously providing both a conventional and an infrared image of the same scene the infrared image is severely out of focus, the present approach provides extended depth of field imaging to rectify the problem of out-of-focus blur for infrared radiation. An imaging system can be realized without any apochromatic lens.

5 Claims, 11 Drawing Sheets

Related U.S. Application Data continuation of application No. 13/454,541, filed on Apr. 24, 2012, now Pat. No. 9,055,248.

(51) Int. Cl.

| | |
|---|---|
| *G02B 27/42* | (2006.01) |
| *G02B 13/14* | (2006.01) |
| *H04N 5/357* | (2011.01) |
| *H04N 9/04* | (2006.01) |
| *H04N 9/07* | (2006.01) |
| *H04N 9/083* | (2006.01) |

(52) U.S. Cl.
CPC ...... *G02B 27/0075* (2013.01); *G02B 27/4211* (2013.01); *H04N 5/3572* (2013.01); *H04N 9/045* (2013.01); *H04N 9/07* (2013.01); *H04N 9/083* (2013.01)

(58) Field of Classification Search
CPC .. G02B 27/4211; G02B 27/005; G02B 13/14; G02B 27/0075
USPC ........................................................ 348/164
See application file for complete search history.

(56) References Cited

U.S. PATENT DOCUMENTS

| | | |
|---|---|---|
| 7,218,448 B1 | 5/2007 | Cathey, Jr. et al. |
| 2003/0124572 A1 | 7/2003 | Umek et al. |
| 2006/0050409 A1 | 3/2006 | George et al. |
| 2007/0145273 A1 | 6/2007 | Chang |
| 2007/0291277 A1 | 12/2007 | Everett et al. |
| 2008/0212168 A1* | 9/2008 | Olmstead ........... G02B 27/0075 359/355 |
| 2008/0308712 A1 | 12/2008 | Ono |
| 2009/0115921 A1* | 5/2009 | Fujinoki ............ G11B 7/1267 349/2 |
| 2010/0315541 A1 | 12/2010 | Egawa |

OTHER PUBLICATIONS

"Bayer Filter", Wkipedia, http://en.wikipedia.org/wiki/Bayer_filter, Apr. 13, 2012, 5 Pages.

Robin Williams et al., "Reflected Infrared Photography: Optical Considerations", Infrared Photography, Medical and Scientific Photography, http://www.msp.rmit.edu.au/Article_03/02d.html, Apr. 8, 2011, 6 Pages.

Nai-Xiang Lian et al., "Adaptive Filtering for Color Filter Array Demosaicking", IEEE Trans Image Process, Oct. 2007; 16(10): 13 Pages.

Oliver Cossairt et al., "Spectral Focal Sweep: Extended Depth of Field from Chromatic Aberrations", 2010 IEEE International Conference on Computational Photography (ICCP), Mar. 29-30, 2010, 8 Pages.

Anat Levin et al., "Image and Depth from a Conventional Camera with a Coded Aperture", ACM Transactions on Graphics (TOG)—Proceedings of ACM SIGGRAPH 2007, vol. 26, Issue 3, Jul. 2007, 9 Pages.

Jeong-Ho Lyu et al., "IR/Color Composite image Sensor with VIPS (Vertically Integrated Photodiode Structure)" 2007 International Image Sensor Workshop, Jun. 7-10, 2007, pp. 267-270, 4 Pages.

Frederic Guichard et al., "Extended depth-of-field using sharpness transport across color channels", © 2009 Society of Photo-Optical Instrumentation Engineers, Proc. SPIE 7250, 72500N (2009), Jan. 19, 2009, 13 Pages.

International Search Report and Written Opinion of the International Searching Authority dated Jun. 5, 2012, in PCT/EP2012/000143.

Manu Parmar, et al., "Interleaved Imaging: An Imaging System Design Inspired by Rod-Cone Vision", Proceedings of SPIE, vol. 7250, XP 2676339, (2009), 8 pages.

Combined Chinese Office Action and Search Report dated Jul. 15, 2015 in Patent Application No. 201210137558.5 (with English translation of categories of cited documents).

* cited by examiner

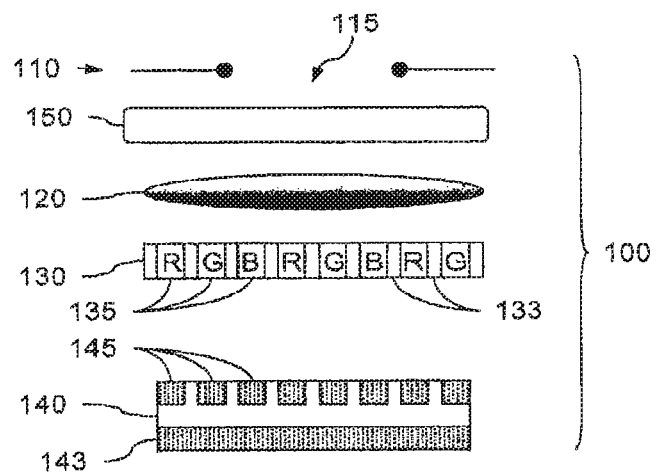
Fig. 2A
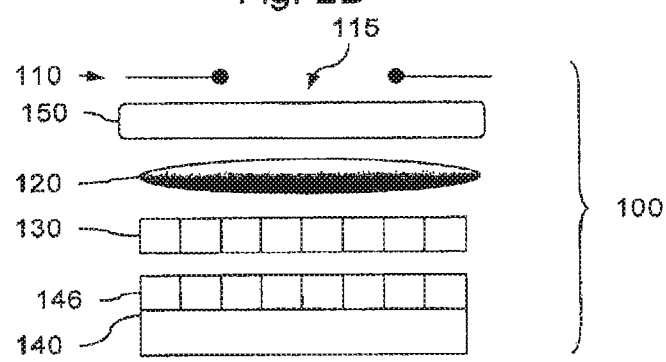
Fig. 2B
Fig. 2C
| R | G | R | G | R | G | R | G |
|---|---|---|---|---|---|---|---|
| IR | B | IR | B | IR | B | IR | B |
| R | G | R | G | R | G | R | G |
| IR | B | IR | B | IR | B | IR | B |

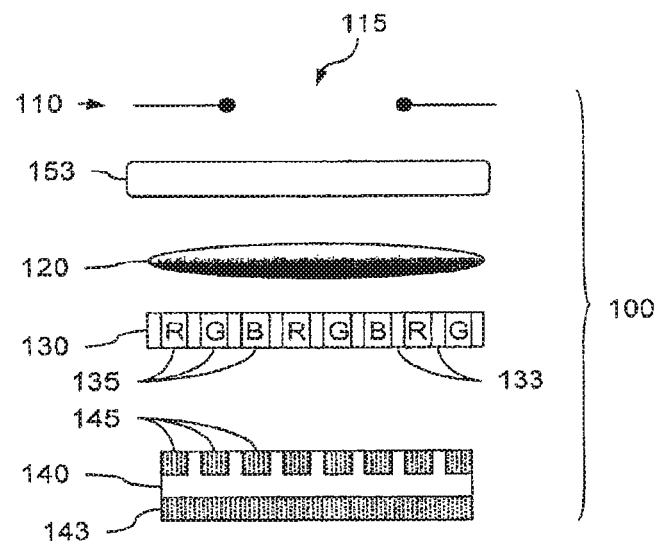
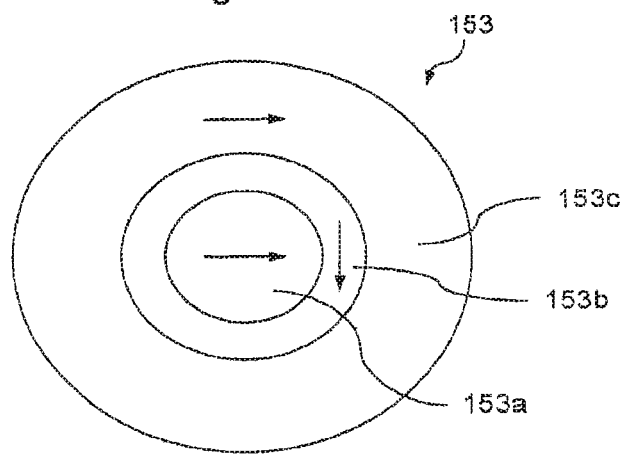

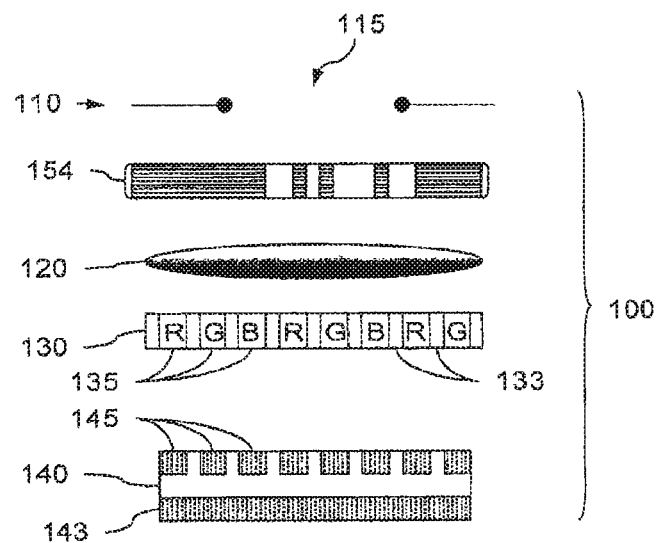
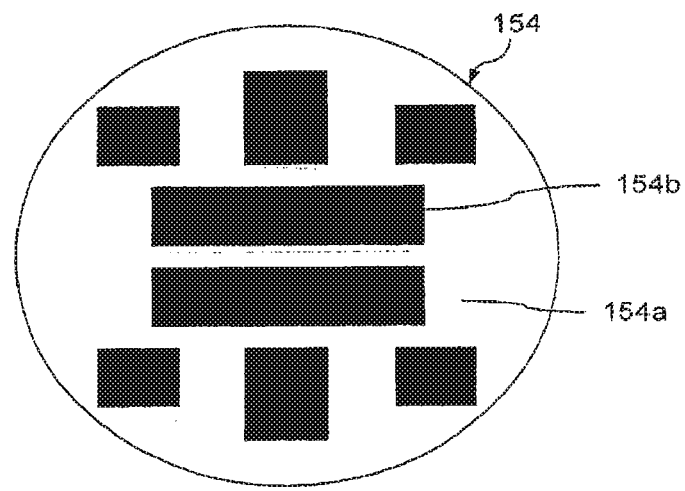

INFRARED IMAGING SYSTEM AND METHOD OF OPERATING

CROSS-REFERENCE TO RELATED APPLICATIONS

This application is a divisional of U.S. patent application Ser. No. 14/701,092, filed Apr. 30, 2015, which is a continuation of U.S. patent application Ser. No. 13/454,541, filed Apr. 24, 2012, now U.S. Pat. No. 9,055,248, and claims the benefit of the earlier filing date of 11 003 573.0 filed in the European Patent Office on May 2, 2011, the entire contents of these applications are incorporated herein by reference.

DESCRIPTION

The present invention relates to the field of infrared imaging techniques. An embodiment relates to an imaging system that includes a not completely colour-corrected lens unit with longitudinal chromatic aberrations and an image processing unit for post-capture digital image processing. A further embodiment refers to a method of operating an electronic device with an infrared imaging system that includes a non-colour-corrected lens unit with longitudinal chromatic aberrations.

Jeong-Ho Lyu et al., "IR/Color Composite Image Sensor with VIP (Vertically Integrated Photodiode Structure)", Proceedings of 2007 International Image Sensors Workshop, Pages 267-270, 2007 describe an image sensor with infrared sensitive photodiodes buried in a substrate below conventional photodiodes. With this type of image sensor, IR (infrared) cut filters are not longer required. U.S. 2007/0145273 A1 refers to infrared colour cameras where visible and non-visible spectral energy is selectively passed through a colour filter array. The spatial distribution of the non-visible spectral energy is mapped to the spatial distribution of the visible spectral energy in a corrected colour image.

F. Guichard et al., "Extended Depth-of-Field using Sharpness Transport across Colour Channels", SPIE, Proceedings of Electronic Imaging, 2009, refers to a method of obtaining images with extended depth-of-field where, for a given object distance, at least one colour plane of an RGB image contains the in-focus scene information. Oliver Cossairt et al., "Spectral Focal Sweep: Extended Depth of Field from Chromatic Aberrations", IEEE International Conference on Computational Photography (ICCP), March 2010, provide a spectral focal sweep camera that deconvolves a binary image obtained with a lens with large longitudinal chromatic aberrations to restore an image with extended depth of field. Shen, C. H. and Chen, H H, "Robust focus measure for low-contrast images", International Conference on Consumer Electronics (ICCE), 2006 suggest using a Discrete Cosine transform energy measure for evaluating focus and sharpness information.

Manu Parmar and Brian Wandell, "Interleaved Imaging: An Imaging System Design inspired by Rod-Con Vision", Proceedings of SPIE, 2009, propose an imaging architecture with a high-sensitive monochromatic pixel set to obtain a greyscale image and a low-sensitive trichromatic pixel set to obtain colour images. Under low-light, spatial information of an output image is mainly derived from the grey scale image, whereas under photopic conditions where the high-sensitive pixels are saturated the output image is only derived from the colour images. Under mesopic conditions the output image is derived from both the colour and the greyscale images, wherein each pixel value is updated taking into account neighbouring pixel values by using a distance function and a similarity function.

The similarity function provides information from both the respective colour and the greyscale image, wherein a weight of the greyscale information is determined by the fraction of saturated pixels in an image patch around the neighbour pixel whose distance and similarity is currently evaluated.

Josep Garcia et al., "Chromatic aberration and depth extraction", Proceedings of 15th International Conference on Pattern Recognition, Pages 762-765, 2000 describe a method for extracting depth information resulting from chromatic aberration for deriving autofocus information. S. Chung et al.; "Removing Chromatic Aberration by Digital Image Processing"; Optical Engineering; Vol. 49 (6); June 2010; suggest removing chromatic aberration by analyzing the colour behaviour on such edges that do not show chromatic aberration for evaluating a range limitation for colour difference signals. Pixel values violating the range limitation condition are identified as colour fringes caused by chromatic aberrations and are replaced with allowed values. Anat Levin et al., "Image and depth from a conventional camera with a coded aperture", ACM Transactions on Graphics—Proceedings of ACM SIGGRAPH 2007, Volume 26 Issue 3, July 2007 describe using a coded aperture and exploiting information about the aperture shape to obtain depth information.

The object of the present invention is providing an enhanced infrared imaging system for obtaining extended depth of field for at least one of the age components, for example for the infrared image component. The object is achieved with the subject-matter of the independent claims. Further embodiments are defined in the dependent claims, respectively. Details and advantages of the invention will become more apparent from the following description of embodiments in connection with the accompanying drawings. Features of the various embodiments may be combined unless they exclude each other.

FIG. 2A is a schematic cross-sectional view of an imaging unit of an imaging system in accordance with an embodiment of the invention.

FIG. 2B is a schematic cross-sectional view of an imaging unit in accordance with an embodiment referring to an imaging sensor unit with one single sensor plane.

FIG. 2C is a schematic plan view of a colour filter unit according to an embodiment.

FIG. 2E is a schematic cross-sectional view of an imaging unit of an imaging system referring to an embodiment of an imaging system including a birefringent element.

FIG. 2F is a schematic top view of a birefringent element in accordance with an embodiment of the invention.

FIG. 2G is a schematic cross-sectional view of an imaging unit in accordance with an embodiment referring to an embodiment of an imaging system including an aperture element.

FIG. 2H is a schematic top view of an aperture element in accordance with an embodiment of the invention.

Figure 1A:
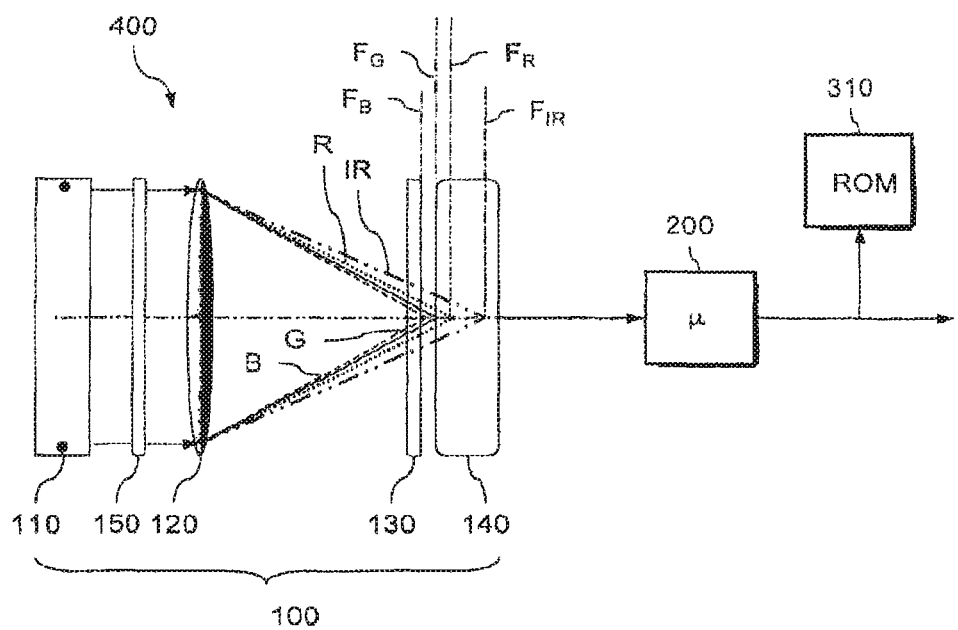
FIG. 1A is a schematic block diagram of an imaging system including a non-colour-corrected lens unit with longitudinal chromatic aberrations in accordance with an embodiment of the invention.

As a convention to simplify the reading in the present text we will call any sub-ranges of the visible and the infrared (IR) radiation spectrum as 'colour'. In particular we will also call IR as a colour, even if this naming is not correct from the perspective of human vision. For example a filter transmitting only radiation in the IR spectral range will be also named 'colour filter'.

FIG. 1 shows an imaging system 400 with an imaging unit 100. The imaging system 400 may be part of a mobile or stationary camera system, for example a surveillance camera system, a camera for diagnostics or surgical methods, a camera embedded in a manufacture process control system, a digital microscope, a digital telescope, or still cameras and video cameras for both consumer and professional applications as well as cameras to detect gestures or poses for remote control or gaming applications. According to other embodiments, the imaging system is integrated in a handheld device including a camera system like a cellular phone, a personal digital assistant, or a music player, by way of example.

The imaging unit 100 includes an aperture unit 110, which is arranged such that radiation passing through the aperture of the aperture unit 110 passes through a lens unit 120 and incidents on an imaging sensor unit 140. The aperture unit 110 may be also positioned inside of the lens unit 120, in particular at the position of the pupil plane of the lens unit 120.

The lens unit 120 may be a single lens, an array of micro-lenses or a lens assembly including a plurality of lenses. The lens unit 120 features a longitudinal chromatic aberration and the imaging unit 100 does not contain elements compensating for the longitudinal (axial) chromatic aberration to generate colour-corrected images. For example, the lens unit 120 is a compound lens formed of a dispersive material like glass or plastics, where the index of refraction is a function of the wavelength of the incident light such that the focal length varies as a function of the wavelength. For example, the lens unit 120 images infrared radiation in a first focal plane $F_{IR}$, visible red light in a focal plane $F_R$, green light in a focal plane $F_G$ and blue light in a focal plane $F_B$.

According to an embodiment the lens unit 120 may include compensation elements compensating for spherical and/or field dependent aberrations such that the lens unit 120 exhibits no or only negligible spherical and field dependent aberrations.

The imaging sensor unit 140 includes a plurality of pixel sensors, wherein each pixel sensor contains a photo sensor for converting a photo signal from the incident radiation into an electronic signal. The imaging sensor unit 140 outputs an image signal containing the pixel values of all pixel sensors of an imaging sensor unit 140 in a digitized form.

The imaging unit 100 may provide a greyscale image and an infrared image. According to other embodiments a colour filter unit 130 may be arranged between the lens unit 120 and the imaging sensor unit 140. The colour filter unit 130 may comprise a plurality of colour filter sections, wherein each colour filter section has a filter colour, for example blue, red, green, white or IR (infrared). Each colour filter section may be assigned to one single pixel sensor such that each pixel sensor receives colour-specific image information. The imaging sensor unit 140 outputs two, three, four or more different sub-images, wherein each sub-image contains image information with regard to a specific frequency range of the incoming radiation and at least one sub-image describes the infrared portion of the imaged scene.

From an imaged scene, the imaging sensor unit 140 captures a first image signal descriptive for an image consisting of or containing at least a portion of the infrared frequency range and at least one second image signal descriptive for a second image containing or consisting of visible light. The imaging sensor unit 140 may capture one, two, three of more non-colour-corrected second images of different spectral content or composition. For example the second images may include a "red" image using the filter colour "red", a "blue" image using the filter colour "blue", and a "green" image using the filter colour "green". The second image signals may also be descriptive for images with overlapping spectral content. For example, the imaging sensor unit 140 may include broadband sensitive pixel sensors which are assigned to broadband colour filter sections with the filter colour "white" being approximately transparent for the whole visible spectrum. Hereinafter the first and second image signals are referred to as first and second colour planes or first and second images. One of the second images may be a grey scale image containing information over the whole visible spectrum.

The imaging system further comprises an optical element 150 that manipulates a first MTF (modulation transfer function) of a first image described by the first image signal in a way that it extends the depth of field of the first image. For example, the optical element 150 lifts the MTF curve assigned to the first image. According to an embodiment, the optical element 150 is designed to shift the values of the MTF curve assigned to the first image to higher values (to "lift" the MTF curve) such that the lowest spatial frequency showing a zero value is close to or beyond the Nyquist frequency limit.

The optical element 150 is arranged in the optical path of the imaging system. Typically with lifting the first MTF contrast for the first image the optical element 150 in turn also lowers the second MTF contrast for at least one of the second images assigned to the visible spectrum. According to an embodiment, the optical element 150 is designed to manipulate the first image such that in a frequency range from zero up to the Nyquist frequency limit none of the second MTF contrasts shows a zero value.

An image processing unit 200 receives the first and second image signals and, for example on the basis of both the first and the second image signals, computes a modified output image signal, wherein the output image signal contains information about the imaged scene and exhibits an extended depth of field for the infrared and/or visible rangecompared to the depth of field of the first or the at least one second image signal generated without the optical element 150. According to an embodiment the image processing unit 200 amplifies a modulation transfer function contrast in the first image signal and/or at least one second image signal by an inverse filtering process.

Figure 1B:
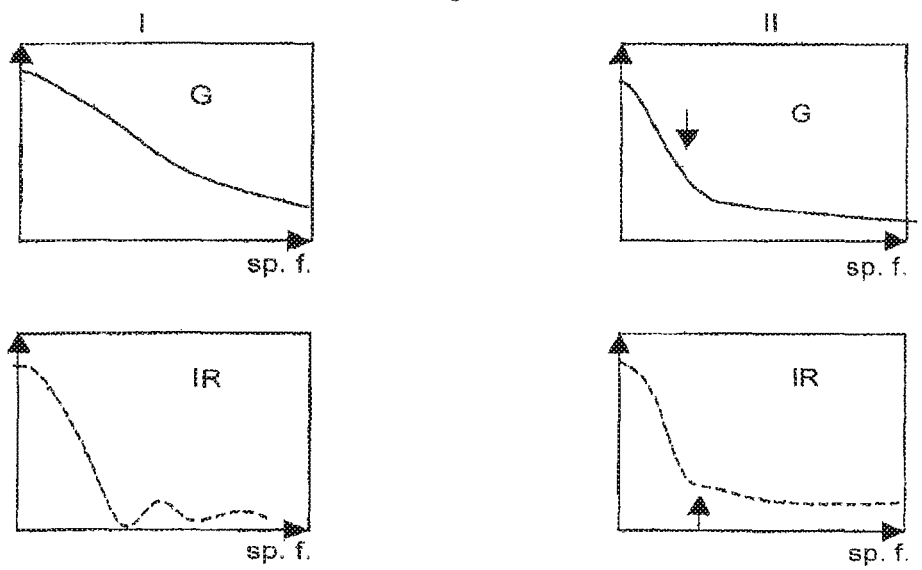
FIG. 1B shows modulation transfer functions useful for the understanding of the principle of operation of the imaging system of FIG. 1A.

FIG. 1B shows in the left hand column typical modulation transfer functions of an imaging system without optical element for green (G) and infrared (IR) radiation and in the right hand column typical modulation transfer functions for green (G) and infrared (IR) radiation obtained by using the above specified optical element 150. The optical element 150 increases the values for the MTF of the infrared image such that no zero value appears in a frequency range between zero and the Nyquist frequency limit. In turn the values for the MTF of the green image may be lowered, wherein the lowering is such that the MTF for the green image still shows no zeroes in a frequency range between zero and the Nyquist frequency. As long as the MTF curve does not zeros at a certain frequency, not all image information above this frequency is lost and image information can be recovered using appropriate image processing techniques like inverse filtering.

An inverse filtering process amplifies the MTF contrast, but at the same time amplifies noise existing in the image. According to an embodiment, a noise level in the image is measured and for low noise images a higher filter gain is applied than for images containing a higher noise level. The imaging system may be designed with low MTFs in all colour channels including the infrared channel but with no zero MTF in a frequency range between zero and the Nyquist frequency limit in any of the colour channels. The optical element 150 is used to shift the MTFs such that they fulfil these requirements.

Figure 1C:
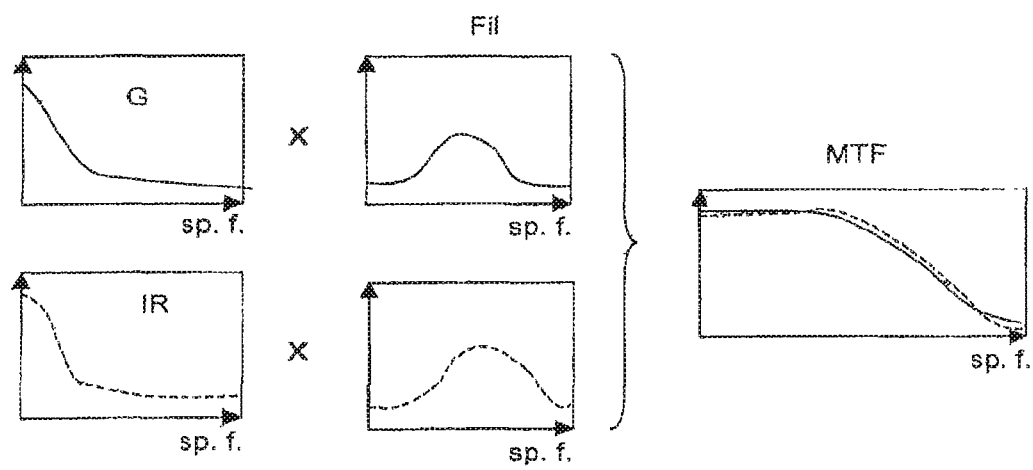
FIG. 1C shows filter and modulation transfer functions useful for the understanding of the principle of operation of the image processing unit of FIG. 1A.

As illustrated in FIG. 1C, the image processing unit 200 may attenuate an adverse effect the optical element 150 may have on the other colour channels. According to the illustrated embodiment, the image processing unit 200 applies inverse filtering with an inverse filter for each colour channel. In accordance with another embodiment, the image processing unit 200 may apply one common inverse filter for all colour channels together. Each of the inverse filters may by space-variant in order to balance a position-dependency of the MTFs, for example with respect to a distance to an centre of the image.

As further illustrated in FIG. 1A, the modified image may be stored in a non-volatile memory 310 of the imaging system 400, for example as a set of digital values representing a coloured image or as two sets of digital values, wherein a first set may represent a greyscale image referring to infrared content of the captured image and a second set may represent a depth map. The non-volatile memory 310 may be a memory card of a camera system. Alternatively or in addition, the modified image may be displayed on a display device of the imaging system 400 or may be output to another system connected to the imaging system 400 via a wired or wireless communication channel may be supplied to a processing system or application for processing further the information contained in the infrared image.

FIG. 2A refers to a schematic cross-sectional view of an imaging unit 100 according to an embodiment. The imaging unit 100 may include an aperture unit 110, wherein during an exposure period radiation descriptive for an image of a scene or object passes through an aperture 115 of the aperture unit 110 and a lens unit 120 and incidents onto an imaging sensor unit 140. The imaging sensor unit 140 comprises a first pixel sensor set 143 and a second pixel sensor set 145. According to an embodiment, the first pixel sensor set 143 is arranged in a first sensor plane and the second pixel sensor set 145 is arranged in a second sensor plane which is spaced from the first sensor plane, for example by about 500 nm to 3000 nm. According to another embodiment, the first and the second sensor planes coincide.

Each pixel sensor contains a photo sensor that converts a photo signal from the incident radiation into an electronic signal. The pixel sensors may be formed in a semiconductor substrate. For example, the imaging sensor unit 140 may have a vertically integrated photodiode structure with deep photodiodes formed in a substrate section few microns beneath surface photodiodes formed adjacent to a substrate surface of a semiconductor substrate. Visible light is absorbed in the surface section of the semiconductor substrate, whereas infrared radiation penetrates deeper into the semiconductor substrate. As a result, the deep photodiodes only receive infrared radiation. In another example, the imaging sensor unit 140 may have a lateral integrated photodiode structure with photodiodes arranged in an array.

The imaging unit 100 may comprise a colour filter unit 130 that may be arranged in close contact to the imaging sensor unit 140. The colour filter unit 130 may include a plurality of colour filter sections 135, wherein each colour filter section 135 has a filter colour, for example green, red, blue, magenta, yellow, white or IR. Each colour filter section 135 is assigned to one single pixel sensor 145 such that each pixel sensor of the second pixel sensor set 145 receives colour-specific image information. For example, the colour filter sections 135 may be arranged matrix-like in columns and rows. Colour filter sections 135 assigned to different filter colours may alternate along the row direction and the column direction in a regular manner. For example, each four colour filter sections 135 forming a 2×2 matrix may be arranged to form a Bayer mosaic pattern, wherein colour filter sections 135 with the filter colour "green" are arranged on a first diagonal of the 2×2 matrix, and one colour filter section 135 with a filter colour "red" and one colour filter section 135 with the filter colour "blue" are arranged on the other diagonal of the 2×2 matrix. With the Bayer mosaic pattern, the sampling rate for the filter colour "green" is twice that of the filter colours "red" and "blue" to take into account that the colour green carries most of the luminance information for the human eye.

According to another embodiment, the colour filter sections 135 may be arranged to form an RGBE-mosaic pattern with "Emerald" as a fourth filter colour, a CYYM mosaic pattern with one cyan, two yellow and one magenta colour filter section 135 or a CYGM mosaic pattern with one cyan, one yellow, one green and one magenta colour filter section 135 arranged in 2×2 unit matrices which are repeatedly arranged within the colour filter unit 130. According to another embodiment, the colour filter unit 130 includes a mosaic of unit matrices with three colour filter sections of three different filter colours and one transparent filter section without colour filtering properties and transparent for all colours within the visible spectrum. The transparent and the colour filter sections 135 may be arranged to form an RGBW mosaic pattern, for example a 4×4 or a 2×4 RGBW mosaic pattern, by way of example.

The infrared radiation may pass the colour filter unit 130 in sections 133 transparent for infrared radiation between the colour filter sections 135. In accordance with an embodiment, the colour filter 130 contains at least one colour filter section type being transparent for infrared radiation. For example, the colour filter 130 is an RGBIR filter where each 2×2 unit matrix contains one red, one green, one blue and one infrared colour filter section 135 and where the unit matrices are regularly arranged to form a mosaic pattern. According to other embodiments the colour filter unit 130 does not include sections assigned to the deep photodiodes, since the colour filter sections 135 may be transparent for a portion of the frequency range of infrared radiation.

The lens unit 120 may be realized as an objective, comprising several single lenses, adapted for imaging objects in the object space to the sensor plane. Due to chromatic aberrations, each colour image blue, green, red and infrared will focus in another focal plane at different distances. In embodiments referring to imaging sensor units with two or more sensor planes, the distance between the first focal plane for infrared radiation and any second focal plane assigned to visible light typically does not match with the vertical distance between the first and second sensor planes. As a consequence, also in this case, at least one of the first and second images is severely out of focus when both the infrared image and the image for visible light are captured contemporaneously.

The imaging sensor unit 140 outputs a first image descriptive for the infrared content of the imaged scene and at least a second image descriptive for the imaged scene in a visible spectral range. An optical element 150 is arranged in the optical path. The optical element 150 modifies the MTF of the first image to obtain the first image with extended depth of field.

FIG. 2B refers to a schematic cross-sectional view of an imaging unit 100 according to an embodiment with one single sensor plane. The imaging unit 100 may include an aperture unit 110, wherein during an exposure period radiation descriptive for an image of a scene or object passes through an aperture 115 of the aperture unit 110 and a lens unit 120 and incidents onto an imaging sensor unit 140. The imaging sensor unit 140 comprises a pixel sensor set 146. According to an embodiment, the pixel sensor set 146 is arranged in one common sensor plane. The optical element 150 modifies the MTF of the first image to obtain the first image with extended depth of field.

FIG. 2C refers to another embodiment, where the colour filter sections 135 of a colour filter unit 130 may form an R-G-B-IR mosaic pattern with "infrared" as a fourth filter colour, arranged in 2×2 unit matrices. The four colours R, G, B and IR can be arranged by any permutation within the 2×2 unit matrices. The colour filter unit 130 may be integrated into the imaging unit 100 of FIG. 2B.

Figure 2D:
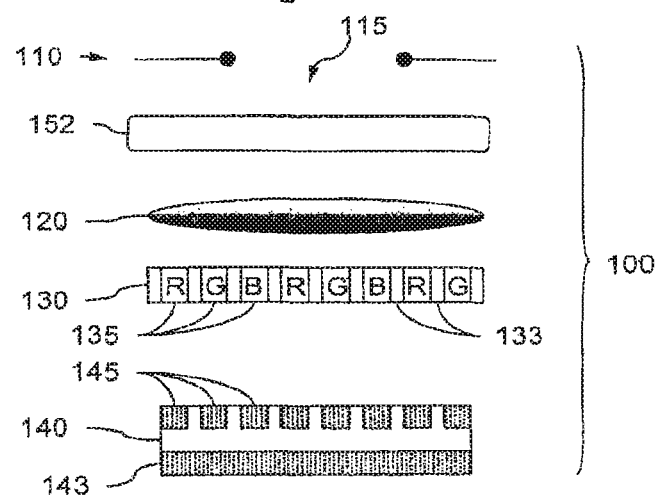
FIG. 2D is a schematic cross-sectional view of an imaging unit of an imaging system referring to an embodiment of an imaging system including a phase element.

In the imaging unit 100 of FIG. 2D the optical element is a phase element 152 adapted to obtain or to approximate a depth-invariant PSF (point spread function) for the imaging system 100 including the lens unit 120 and the phase element 152. Convolving an imaged signal with an inverse filter designed by applying a almost depth-invariant PSF results in an approximately all-in-focus image. Tuning a PSF of the imaging system 100 such that the PSF is invariant over a sufficiently large depth of field therefore allows for reducing the longitudinal chromatic aberration of the lens unit 120 and the effect of a focal shift between the first and second images. Instead of a phase element 152 a birefringent element 153 or an aperture filter element 154 may be used FIG. 2E refers to an embodiment with the optical element being a birefringent element 153 arranged in an optical path of an imaging unit 100 in a pupil plane of a lens unit 120. The birefringent element 153 is designed to modify the first modulation transfer function assigned to the first image to extend depth of field of the first image, wherein the modulation transfer functions assigned to the first and/or at least one second image signals have no zero values in a frequency range up to a Nyquist frequency limit. The birefringent element 153 may comprise a birefringent material, for example a liquid crystal poly layer. The liquid crystal polymer layer may be formed on a carrier substrate. An uniaxial axis of the liquid crystal is oriented approximately parallel to a surface plane of the birefringent element 153, wherein the birefringent element 153 is arranged with the surface plane orthogonal to the optical path of the imaging unit 100. In the surface plane an orientation of the uniaxial axis varies across the birefringent element 153. Instead of a birefringent element 153 a phase element 152 or an aperture filter element 154 may be used FIG. 2F illustrates an embodiment of the birefringent element 153 of FIG. 2E. According to this embodiment, the birefringent element 153 is divided into a plurality of zones 153a, 153b, 153c, wherein in at least two of the zones 153a, 153b, 153c the orientations of the uniaxial axes differ from each other. The zones 153a, 153b, 153c may assume different geometrical shapes. According to an embodiment, all but one 153b, 153c of the zones are concentric annular rings surrounding a circular inner zone 153a.

In addition to or instead of the phase element 152 of FIG. 2D the imaging system of FIG. 2G includes an aperture element 154. The aperture element 154 may be a carrier supporting a pattern with structures of different transmittance. The aperture element 154 may be used to modify the first modulation transfer function assigned to the first image to extend depth of field of the first image, wherein the modulation transfer functions assigned to the first and/or at least one second image signals have no zero values in a frequency range up to a Nyquist frequency limit. The aperture element 154 may be arranged in the pupil plane of the lens unit 120 of the imaging unit 100.

FIG. 2H shows details of an aperture element 154. In accordance with an embodiment, the pattern of the aperture element 154 comprises transparent 154a and opaque structures 154b. According to another embodiment, at least some of the structures are semi-transparent with a transmittance between 0% and 100%. The structures may assume any geometrical shape and can be arranged in any order suitable for modifying the MTFs in the required way. In accordance with an embodiment, the transmittance of the sections depends on the wavelength of light.

Figure 3A:
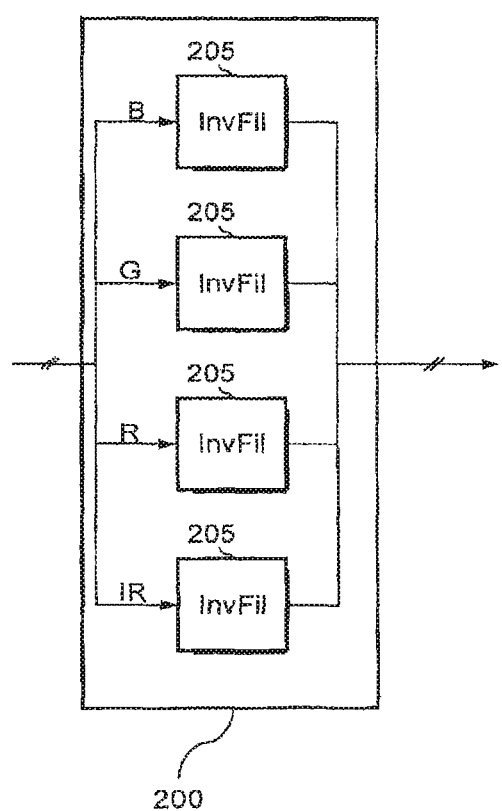
FIG. 3A is a schematic block diagram of an image processing unit in accordance with an embodiment providing an inverse filter in each image signal path.

FIG. 3A shows an image processing unit 200 using information contained in the first image signal IR, which represents the image scene in the frequency range containing infrared radiation, and at least one second image signal, for example a second image signal R representing the imaged scene in the frequency range containing red light, a further second image signal G representing the imaged scene in the frequency range containing green light and a further second image signal B representing the imaged scene in the frequency range containing blue light. The image processing unit 200 includes inverse filter units 205. Each of the inverse filter units 205 is assigned to one of the image signals output by the imaging unit 100. Each inverse filter unit 205 is a linear spatial filter, whose filter function is the inverse of the frequency response of a blurring function for the respective image signal. Since each image signal suffers from another defocus, the inverse filter units 205 represent different filter functions.

Figure 3B:
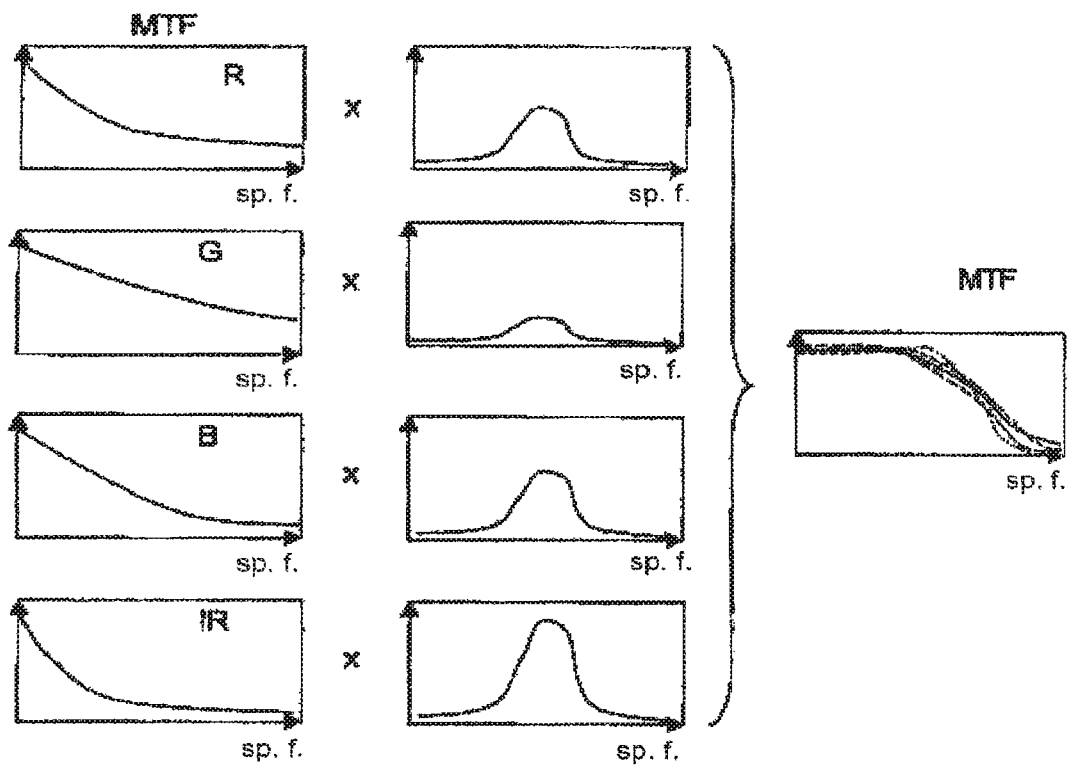
FIG. 3B shows schematic diagrams illustrating the function of the image processing unit of FIG. 3A.

On the left-hand side, FIG. 3B shows diagrams for optical MTFs dulation transfer functions) representing the image signals R, G, B, IR of an imaged scene obtained by using an imaging system based on an RGBIR imaging sensor. The diagrams in the centre column schematically illustrate a-priori known inverse filter functions for the inverse filter units 205. The diagram on the right hand side shows the resulting opto-digital MTF curves.

Figure 4A:
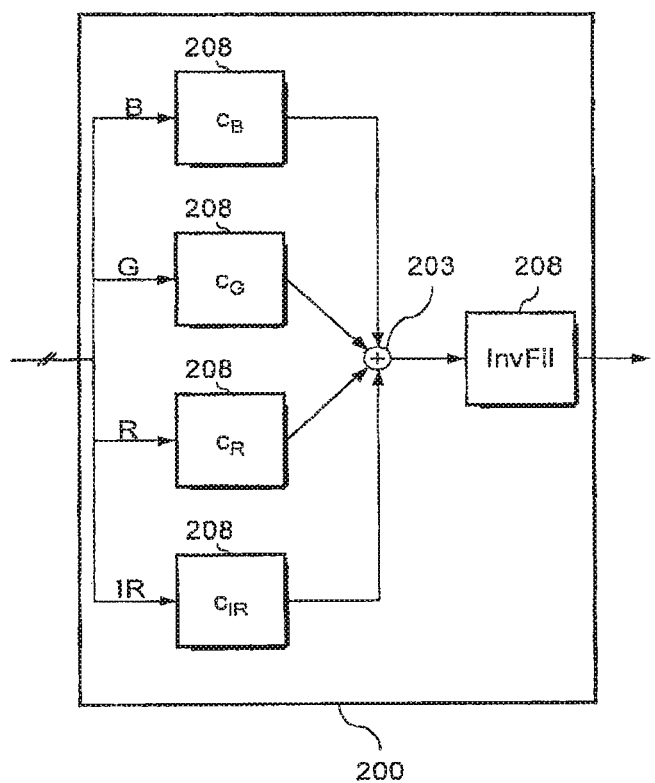
FIG. 4A is a schematic block diagram of an image processing unit in accordance with an embodiment providing an inverse filter effective on a weighted sum signal of the image signals.

According to the embodiment of FIG. 4A the image processing unit 200 uses information contained in the first image signal and the at least one second image signal by generating an intensity signal from the first and second image signals.

The image processing unit 200 may include weighting units 208 for weighting each of the image signals with predetermined coefficients $c_B$, $c_R$, $c_G$, $c_{IR}$. A summation unit 203 may superpose or sum up the weighted image signals to obtain an intensity signal. An inverse filter unit 205 applies a predetermined inverse filter function for the intensity signal to the intensity signal. The coefficients and/or the inverse filter function may be computed a-priori from the lens data.

Figure 4B:
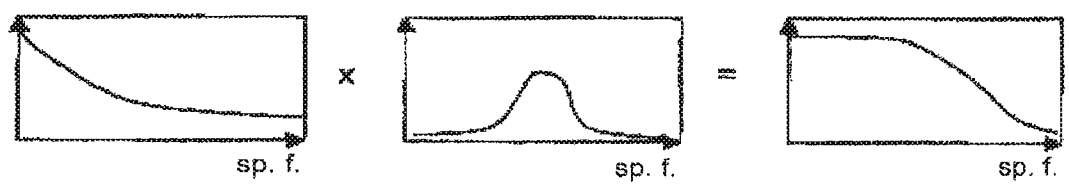
FIG. 4B shows schematic diagrams illustrating the function of the image processing unit of FIG. 4A.

On the left-hand side, FIG. 4B shows the diagram for the MTF of the intensity signal derived from an imaged scene obtained by using an imaging system based on an RGBIR imaging sensor. The diagram in the centre schematically illustrates an a-priori known/adaptive inverse filter function for the inverse filter unit 205. The diagram on the right hand side shows the resulting opto-digital MTF curve for the intensity signal. Since no chrominance is processed, this approach suffers from less chromatic noise enhancement than embodiments using individual inverse filter functions.

Figure 5A:
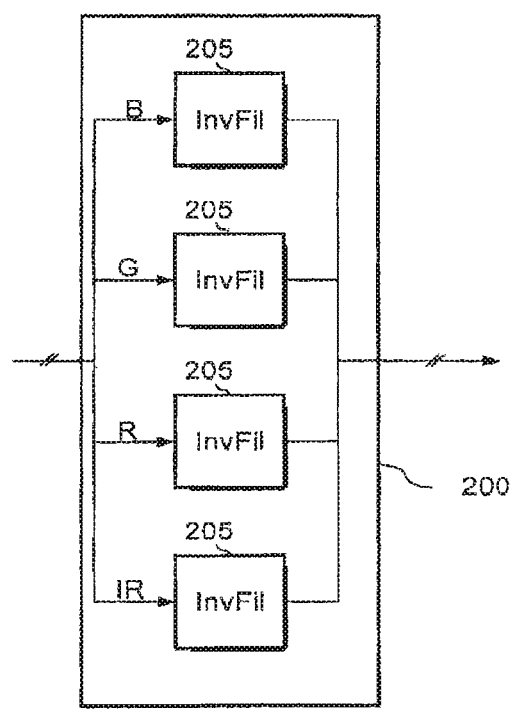
FIG. 5A is a schematic block diagram of an image processing unit in accordance with an embodiment providing inverse filters in each image signal path and a phase element in the imaging system.

FIG. 5A refers to an embodiment using a phase or birefringent element in the optical path of an imaging system as illustrated in FIGS. 2D and 2E for obtaining a PSF which is depth-invariant over a certain range. The image processing unit 200 includes inverse filter units 205, wherein each of the inverse filter units 205 applies the same inverse filter function to the corresponding image signal output by the imaging unit 100. The inverse filter function is designed on the basis of the obtained PSF for the image system containing the phase or birefringent element such that an all-in-focus image is obtained.

Figure 5B:
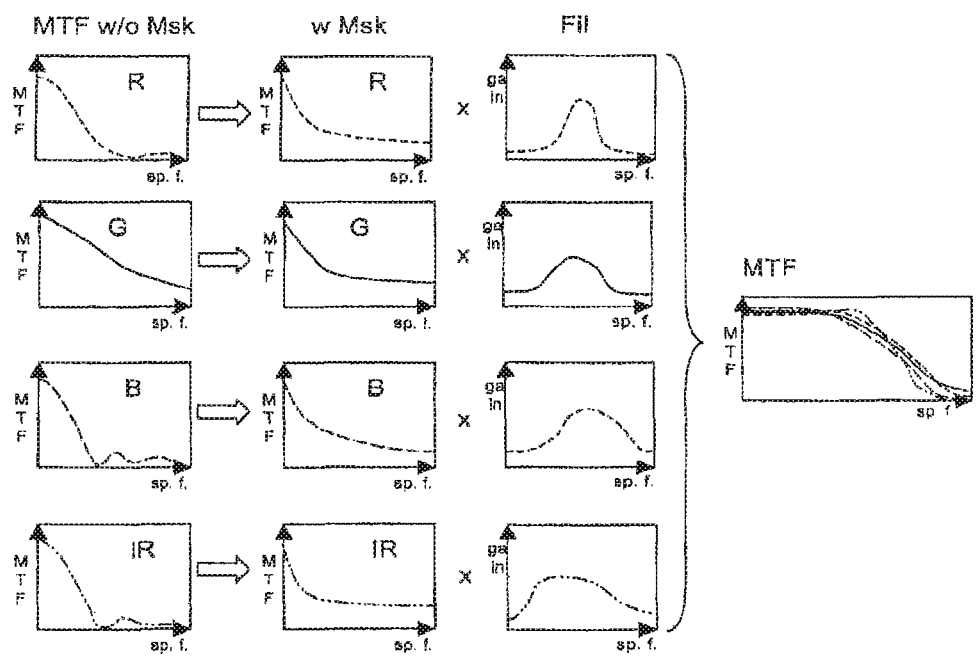
FIG. 5B shows schematic diagrams illustrating the function of the image processing unit of FIG. 5A.

On the left hand side, FIG. 5B shows a diagram with the optical MTFs representing the image signals R, G, B, IR of an imaged scene obtained by using an imaging system based on an RGBIR imaging sensor but without any phase element. The diagrams in the second column schematically illustrate the resulting MTFs using a phase element. Without phase element, the MTF curve for the green colour plane has a significant amplitude over a wide range of spatial frequency, whereas all other MTF curves quickly drop down to zero. As a result, only the image signal for the colour green will focus in the sensor plane, whereas the other colours will focus at different distances in other focal planes. The effect of the phase element is slightly lowering the MTF for the green colour while significantly lifting the MTF curves of the other colours above zero. As illustrated in the third column, individual inverse filter functions are applied by the inverse filter units 205 to each image signal in order to achieve the targeted opto-digital MTF curves. The diagram on the right-hand side shows the resulting opto-digital MTFs curves at the output of the imaging processing unit 200.

Figure 6:
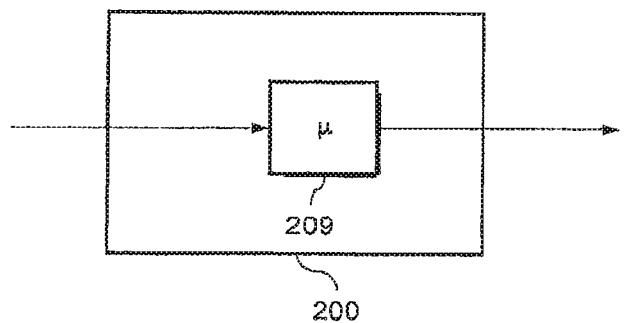
FIG. 6 is a schematic block diagram of an image processing unit in accordance with an embodiment providing an aperture element in the imaging system.

FIG. 6 refers to an embodiment with the image processing unit 200 comprising a computing unit 209 configured to compute an all-in-focus image on the basis of the aperture shape of an aperture element as illustrated in FIG. 2G.

In each of the above embodiments, all elements of the image processing unit 200 may be embodied by hardware only, for example as integrated circuits. FPGAs (field programmable gate arrays), ASICs (application specific integrated circuits), by software only, which may be implemented, for example in a computer program or a microcontroller memory, or by a combination of hardware and software elements. According an embodiment, the image processing unit 200 is integrated in an integrated circuit.

Figure 7:
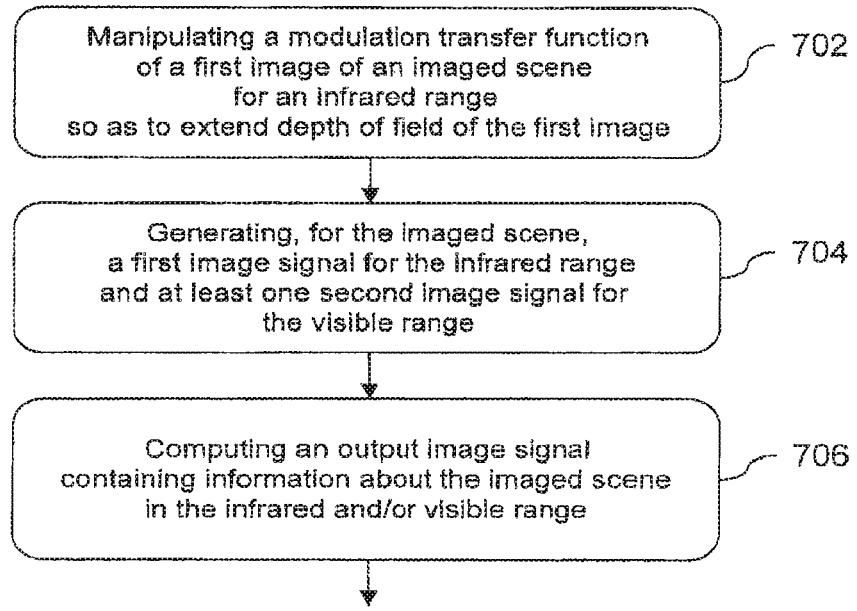
FIG. 7 is a simplified flowchart of a method of operating an electronic device with an imaging system in accordance with an embodiment referring to extended depth of field for infrared sensors.

FIG. 7 refers to a method of operating an electronic device with an imaging system showing longitudinal chromatic aberration. By using an optical element arranged in an optical path of an imaging unit, a first modulation transfer function assigned to a first image descriptive for an imaged scene in a first frequency range containing an infrared range is manipulated to extend the depth of field of the first image (702). From the imaged scene, a first image signal describing the first image and at least one second image signal imaging the imaged scene in a second frequency range containing a visible range are generated (704). Image signal processing provides an output image signal containing information about the imaged scene in the infrared and/or visible frequency range (706).

According to an embodiment the image signal processing amplifies a modulation transfer function in the first image signal and/or at least one second image signal by an inverse filtering process to compensate for an adverse effect of the optical element on the second images.

Where the imaged scene is focused at a first focal plane for the first frequency range and at a second focal plane for the second frequency range, the extended depth of field of the output image signal may compensate for the focal shift resulting from a distance between the first and second focal planes.

Where in conventional approaches for RGBIR sensors, which contemporaneously provide a conventional image in the visible range and an IR image of the same scene, the IR image is severely out of focus, the present approach provides all-in-focus or extended depth of field imaging to rectify the problem of out-of-focus blur for infrared radiation as well as radiation in the visible range. The imaging system can be realized without any apochromatic lens.

The invention claimed is:
1. An imaging system comprising:
a lens showing longitudinal chromatic aberration;
an image sensor including a plurality of pixel sensors to each capture one of a red, green, blue, and infrared image signal;
a signal processor configured to apply a different inverse filter function to each of the red, green, blue, and infrared image signals; and
an optical element comprising a birefringent element, wherein
the birefringent element comprises a liquid crystal polymer layer with a uniaxial axis of a liquid crystal oriented approximately parallel to a surface plane of the birefringent element, and
the birefringent element is divided into a plurality of zones and in at least two of the plurality of zones orientations of the uniaxial axes differ from each other.

2. The imaging system of claim 1, wherein
the birefringent element is arranged with the surface plane orthogonal to an optical path of the imaging system, and
the orientation of the uniaxial axis in the surface plane varies across the birefringent element.

3. The imaging system of claim 1, wherein
the birefringent element is divided into at least three zones.

4. The imaging system of claim 1, wherein
all but one of the zones are concentric annular rings surrounding a circular inner zone.

5. The imaging system of claim 1, wherein
the optical element is configured to manipulate a first modulation transfer function assigned to a first image signal imaging an imaged scene in a first frequency range containing a first wavelength range to extend a depth of field of the first image signal by shifting values of the first modulation transfer function to higher values such that the values of the first modulation transfer function has no zero values in a third frequency range up to a targeted frequency limit, and such that values of all of second modulation transfer functions assigned to at least one second image signal imaging the imaged scene in a second frequency range containing a second wavelength range after being shifted to lower values due to the manipulation by the optical element have no zero values in the third frequency range up to the targeted frequency limit.

* * * * *